(12) United States Patent
Gurvich et al.

(10) Patent No.: US 12,467,499 B2
(45) Date of Patent: Nov. 11, 2025

(54) DRIVE SHAFT WITH NON-CYLINDRICAL SHAPE AND SPACED REINFORCEMENTS

(71) Applicant: Hamilton Sundstrand Corporation, Charlotte, NC (US)

(72) Inventors: Mark R. Gurvich, Middletown, CT (US); Brayton Reed, New York Mills, NY (US); Joyel Schaefer, Earlville, NY (US); Michael J. King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 422 days.

(21) Appl. No.: 17/892,268

(22) Filed: Aug. 22, 2022

(65) Prior Publication Data

US 2024/0060527 A1 Feb. 22, 2024

(51) Int. Cl.
*F16C 3/02* (2006.01)
(52) U.S. Cl.
CPC .......... *F16C 3/026* (2013.01); *F16C 2208/02* (2013.01); *F16C 2326/06* (2013.01); *F16C 2326/43* (2013.01)
(58) Field of Classification Search
CPC .. F16C 3/026; F16C 2208/02; F16C 2326/06; F16C 2326/43
USPC .............................................. 464/79–80, 181
See application file for complete search history.

(56) References Cited

U.S. PATENT DOCUMENTS

| | | |
|---|---|---|
| 1,862,806 A | 6/1932 | Ringwald |
| 2,000,997 A | 5/1935 | Sharpe |
| 2,195,993 A | 4/1940 | Morrill |
| 2,798,507 A | 7/1957 | St. Clair |
| 3,472,062 A | 10/1969 | Owen |

(Continued)

FOREIGN PATENT DOCUMENTS

| | | |
|---|---|---|
| CN | 112434389 A | 3/2021 |
| DE | 629625 C | 5/1936 |

(Continued)

OTHER PUBLICATIONS

AAMT Top Drawer Teachers, Convex and Non-convex Polygons, Education Services Australia Ltd., 2013.

(Continued)

*Primary Examiner* — Greg Binda
(74) *Attorney, Agent, or Firm* — Carlson, Gaskey & Olds, P.C.

(57) ABSTRACT

A drive shaft body has an axial cross-sectional shape, which includes a plurality of undulations increasing a drive shaft body diameter through an infinite number of diameters across at least 15% of an axial length between axial ends. There is at least one reinforcing belt associated with adjacent ones of the plurality of undulations. In another drive shaft, a drive shaft body has an axial cross-sectional shape which includes undulations increasing a drive shaft body diameter through an infinite number of diameters across at least 15% of an axial length between the axial ends. The undulations extend along a non-zero angle relative to a circumferential direction defined relative to a drive axis of the drive shaft, such that the undulations form a spiral with an intermediate smaller diameter spiral portion. There is at least one reinforcing belt associated with at least one of the undulations and the intermediate portion.

13 Claims, 8 Drawing Sheets

(56) References Cited

U.S. PATENT DOCUMENTS

| | | | |
|---|---|---|---|
| 4,173,128 | A | 11/1979 | Corvelli |
| 4,289,557 | A | 9/1981 | Stanwood et al. |
| 4,391,594 | A * | 7/1983 | Hannibal ................ F16D 3/725 |
| | | | 464/80 |
| 4,777,868 | A | 10/1988 | Larsson |
| 6,328,656 | B1 | 12/2001 | Uchikawa et al. |
| 6,695,705 | B2 | 2/2004 | Stervik |
| 8,636,484 | B2 | 1/2014 | Simmons et al. |
| 11,260,605 | B2 | 3/2022 | Iyer et al. |
| 11,273,610 | B2 | 3/2022 | Reed et al. |
| 2012/0283029 | A1 | 11/2012 | Lawrie |
| 2014/0128168 | A1 | 5/2014 | Laskey et al. |
| 2018/0335077 | A1 | 11/2018 | Oessenich et al. |
| 2020/0132109 | A1 * | 4/2020 | Schaefer ................ F16D 3/725 |
| 2020/0298505 | A1 | 9/2020 | Reed et al. |

FOREIGN PATENT DOCUMENTS

| | | | | |
|---|---|---|---|---|
| DE | 19908604 A1 | 12/1999 | | |
| EP | 3193029 A1 | 7/2017 | | |
| FR | 695.949 | * 12/1930 | ..................... | 464/79 |
| JP | S60168913 A | 9/1985 | | |
| JP | 62075135 A | 4/1987 | | |

OTHER PUBLICATIONS

European Search Report for EP Application No. 23191699.0 dated Feb. 29, 2024.
European Search Report for EP Application No. 19212879.1 dated Jul. 10, 2020.
European Search Report for EP Application No. 21192471.7 dated Sep. 6, 2021.

* cited by examiner

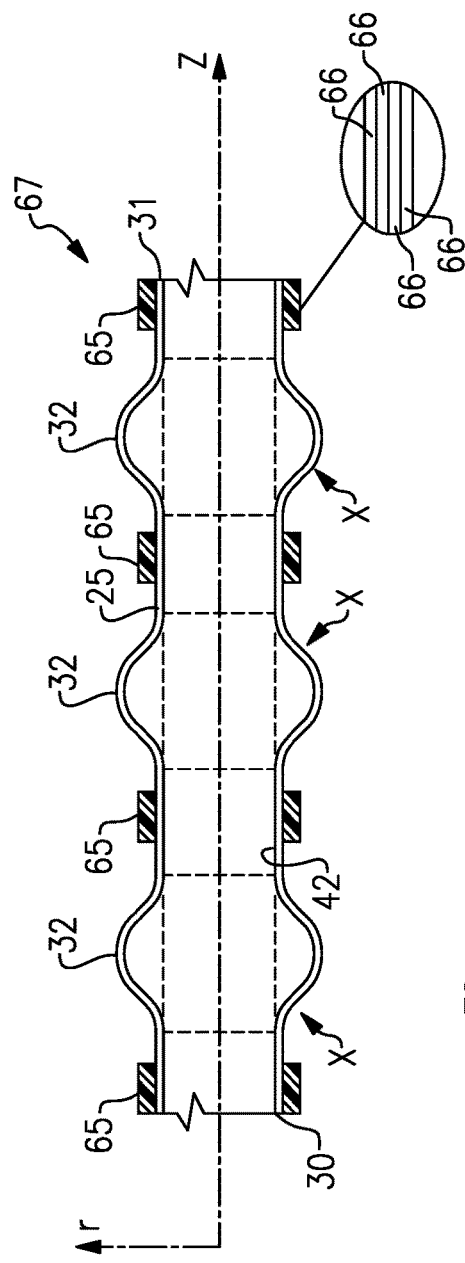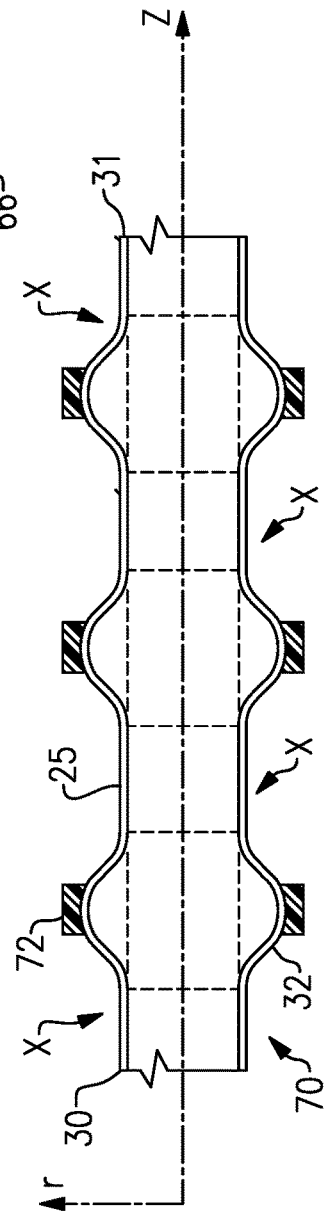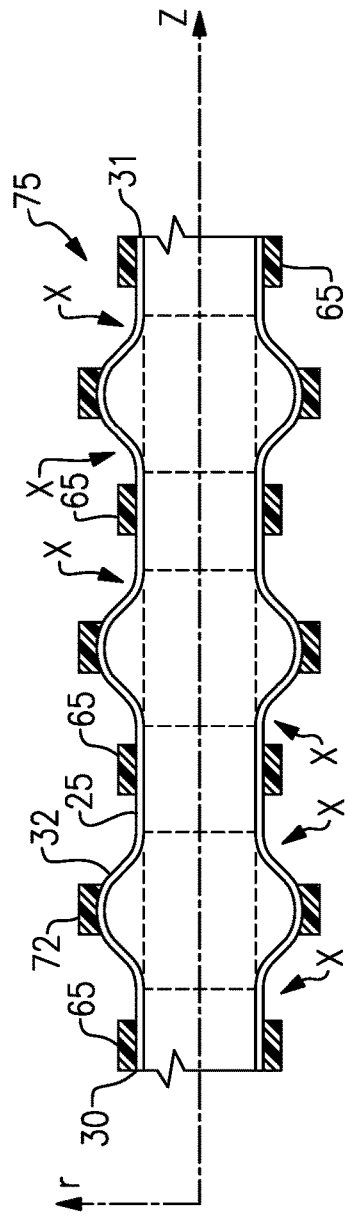

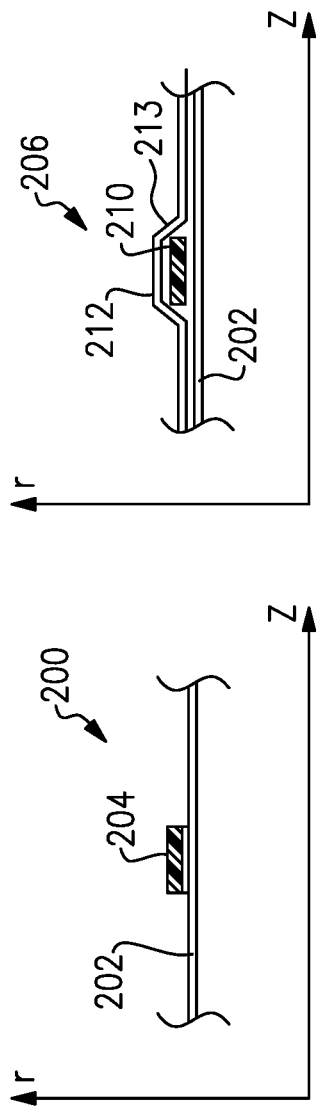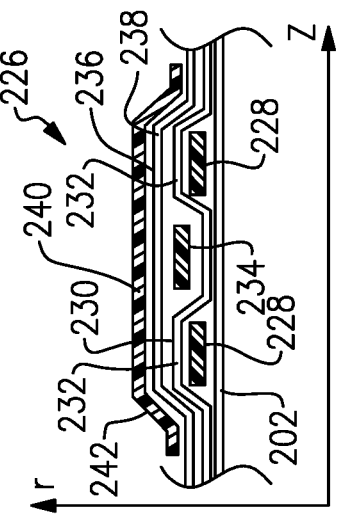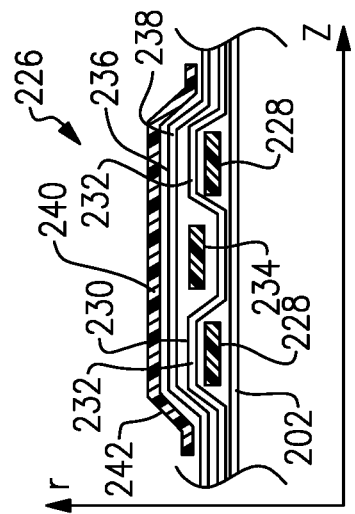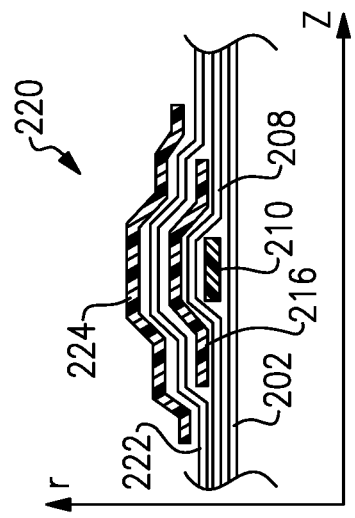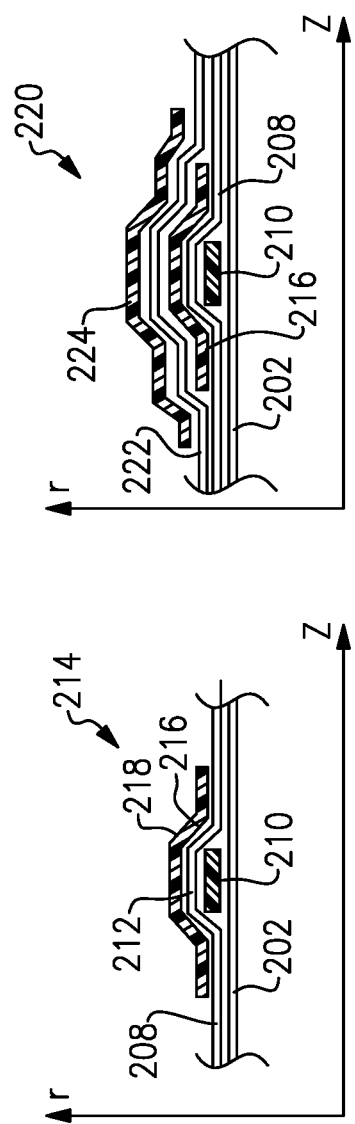

DRIVE SHAFT WITH NON-CYLINDRICAL SHAPE AND SPACED REINFORCEMENTS

BACKGROUND

This application relates to drive shafts having non-cylindrical shapes.

Drive shafts are known and utilized to connect any number of driven components to transfer loads, and mainly, torsional loads. Among many known typical examples of such applications are drive shafts to transfer torque from an engine of main rotor to a tail rotor in rotorcraft configurations.

Historically, drive shafts have had a cylindrical tubular portion with constant cross-section along the shaft length extending between diaphragms at each ends. The diaphragms allow flexibility under bending and axial load, as the drive axes and positions between the drive input and the driven component may vary during service or have some unavoidable misalignments.

Drive shafts have also been proposed that have undulations that can enhance bending and axial flexibility, i.e., provide an alternative to the use of relatively expensive diaphragms.

SUMMARY

A drive shaft includes a drive shaft body extending between axial ends and having an axial cross-sectional shape, which includes a plurality of undulations increasing a drive shaft body diameter through an infinite number of diameters across at least 15% of an axial length between the axial ends. There is at least one reinforcing belt associated with adjacent ones of the plurality of undulations.

A drive shaft includes a drive shaft body extending between axial ends and having an axial cross-sectional shape which includes undulations increasing a drive shaft body diameter through an infinite number of diameters across at least 15% of an axial length between the axial ends. The undulations extend along a non-zero angle relative to a circumferential direction defined relative to a drive axis of the drive shaft, such that the undulations form a spiral with an intermediate smaller diameter spiral portion. There is at least one reinforcing belt associated with at least one of the undulations and the intermediate portion.

These and other features may be best understood from the following drawings and specification.

BRIEF DESCRIPTION OF THE DRAWINGS

FIG. 2A shows an axial cross-section of the first embodiment having a first option for reinforcing belts.

FIG. 2B shows an axial cross-section of the first embodiment having a second reinforcement belt option.

FIG. 2C shows an axial cross-section of the first embodiment having a third reinforcement belt option.

FIG. 6A shows a fragment of an axial cross-section of a drive shaft wall with a reinforcement belt option.

FIG. 6B shows a fragment of an axial cross-section of a drive shaft wall with another reinforcement belt option.

FIG. 6C shows a fragment of an axial cross-section of a drive shaft wall with another reinforcement belt option.

FIG. 6D shows a fragment of an axial cross-section of a drive shaft wall with another reinforcement belt option.

FIG. 6E shows a fragment of an axial cross-section of a drive shaft wall with another reinforcement belt option.

DETAILED DESCRIPTION

Figure 1A:
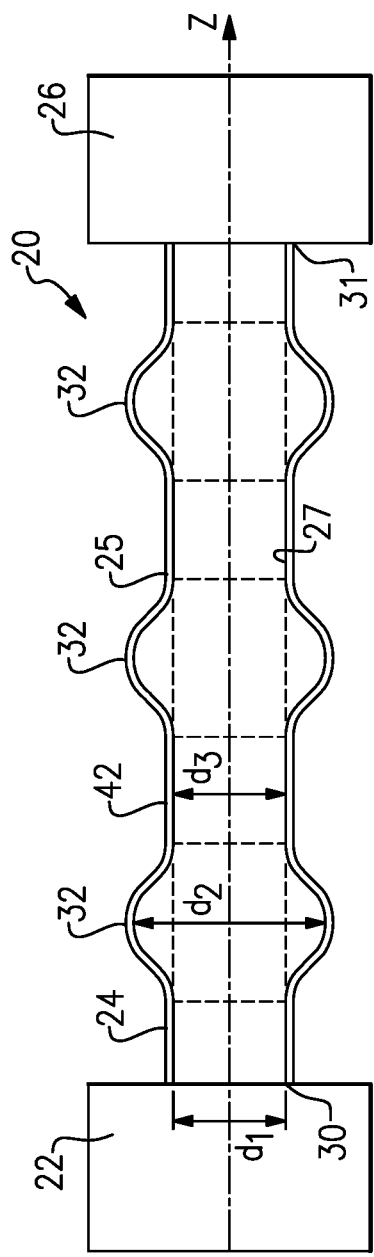
FIG. 1A shows an axial cross-section of a first embodiment having a first type undulation.

A drive assembly 20 is illustrated in FIG. 1A as an axial cross-sectional view for connecting a drive input 22 to a component to be driven 26. The component to be driven 26 may be an example of a tail rotor in a helicopter. However, the teachings of this disclosure extend to other drive applications. Under some conditions, the input axis from the drive input 22 and the axis to the component 26 may vary during service or due to installation misalignment, thus, an intermediate drive shaft 24 desirably accommodates such bending or/and axial deformation. The drive shaft 24 has an outer peripheral surface 25 and inner peripheral surface 27 extending between axial ends 30 and 31. As shown, a diameter of the drive shaft 24 changes in a continuous manner between the ends 30 and 31 in the FIG. 1A embodiment. It could be said that the diameter changes through an infinite number of diameters at undulations 32 between the ends 30 and 31.

In the prior art, shafts typically were connected to the input 22 and driven component 26 through metal diaphragms that provided flexibility. There would be an intermediate shaft. However, the prior flexible metallic diaphragms and rigid shaft body have increased cost and raised challenges, e.g., manufacturing quality requirements for the diaphragms. Thus, as will be mentioned below, several shaft embodiments with undulations were disclosed in a prior patent application.

As shown, a first smaller diameter $d_1$ may be found at the end 30, with an intermediate increasing diameter $d_2$ at undulation 32, and a smaller diameter $d_3$ at intermediate portions 42 of the drive shaft illustrated between increasing diameter undulations 32. A design such as shown in FIG. 1A may be especially helpful in optimization of bending flexibility of the shaft while keeping torsional stiffness and strength unaffected. The design can also help to optimize parameters of dynamic behavior of the shaft, such as, for example, frequencies of free vibrations.

The description of changing through an infinite number of diameters is to distinguish drive shafts having distinct radially outwardly extending rings, as an example. The limitation "infinite number of diameters" should be interpreted with the analysis of a curve under calculus in mind, i.e., with definition of shaft outer or inner shape as continuous variation of diameter as a function of the shaft axial position. It does not imply any particular length of curve other than as may otherwise be mentioned in this document.

Figure 1C:
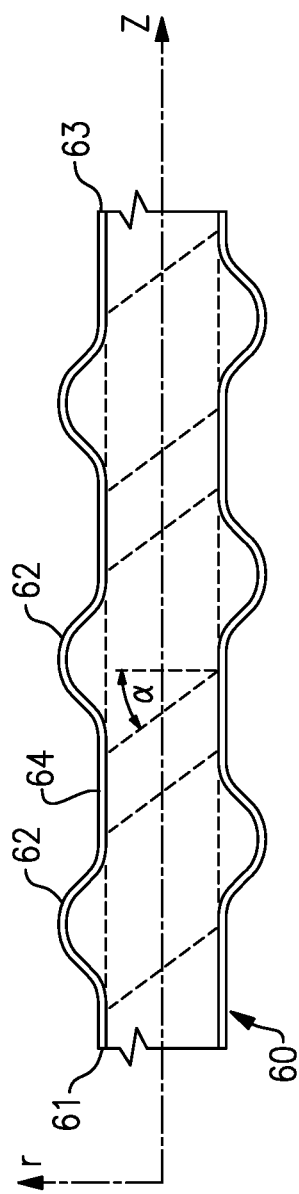
FIG. 1C shows an axial cross-section of a third embodiment having a third type undulation.
Figure 1B:
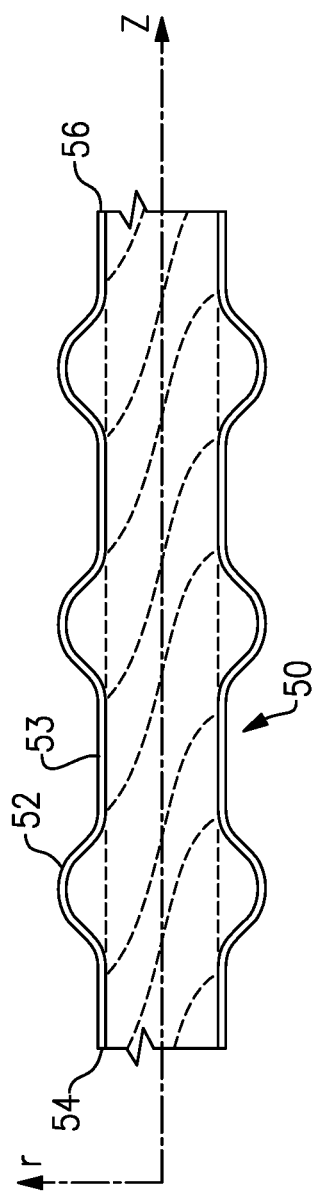
FIG. 1B shows an axial cross-section of a second embodiment having a second type undulation.

FIG. 1B shows yet another drive shaft embodiment 50. Drive shaft embodiment 50 has local spiral undulations 52, which extend at a non-zero angle relative to a hoop or circumferential direction about a central axis Z. As can be seen in the embodiment 50, the undulations 52 extend entirely between the ends 54 and 56. There are intermediate smaller diameter portion 53 between the spiral undulations. While there is a single spiral, for purposes of this application it can be said to include a plurality of undulations. Other embodiments of the design shown in FIG. 1B can include multiple spirals placed with increment(s) along the axial direction of the shaft.

Drive shafts generally having the structure mentioned above are disclosed and claimed in co-pending U.S. patent application Ser. No. 16/585,009 filed on Sep. 27, 2019, now U.S. Pat. No. 11,486,439 and having a common Applicant with the instant application. Aspects of that application are incorporated by reference herein.

FIG. 1C shows yet another option 60. Option 60 has undulations 62 which are formed at an angle, but which do not extend entirely around the drive shaft body as in the FIG. 1B embodiment. In a sense, there are intermediate spaced areas 64 without an undulation between undulations 62. The body extends from end 61 to end 63.

What could be said that each of the embodiments of FIGS. 1A-1C have in common, is that they all have undulations which change a shaft outer diameter through an infinite number of diameters, and wherein the undulations extend over at least 15% of the length of the drive shaft between its ends.

The embodiment shown in FIGS. 1A-1C could be said to include a drive shaft having an outer diameter measured about a rotational axis z that changes through a portion of an axial length between ends of the drive shafts and through an infinite number of diameters through a portion extending across at least 15% of the axial length. More narrowly, the infinite number of diameters occurs across at least 33% of the axial length.

The several disclosures of FIGS. 1A-1C provide a designer with a powerful ability to design a drive shaft for a specific challenge. The drive shafts of this disclosure may be formed of fiber-reinforced polymer-matrix composite material. Thermoset or thermoplastic resins may be used as polymeric matrices, while fiber reinforcement may be performed, for example, by carbon fibers, glass fibers, organic fibers or their combinations. Metals and alloys based on, for example, aluminum, titanium, steel or other metallic materials may also be used.

Reinforcing belts will be disclosed below. The materials of the shaft body and the reinforcing belts could be the same material, or could be different materials. Automated fiber placement (AFP), filament winding, braiding or manual layups are among applicable manufacturing processes to implement the reinforcing belts, as will also be disclosed below.

By carefully designing the cross-sectional shape of the shaft as a function of shaft length, additional design parameters can be optimized to achieve desired structural performance for specific load scenarios, or to satisfy contradictory trends such as, for example, a high torsional stiffness with a relatively high bending flexibility, or to satisfy challenges of excessive vibrations of relatively thin-wall lightweight designs.

A first embodiment 67 is shown in FIG. 2A. Embodiment 67 incorporates a shaft body like that shown in FIG. 1A. Between the ends 30 and the first enlarged diameter undulation 32 there is a reinforcing belt 65. Similarly, there is a reinforcing belt 65 between a last enlarged diameter undulation 32 and end 31.

There are also reinforcing belts 65 on the smaller diameter intermediate portions 42 between adjacent ones of the enlarged diameter undulations 32.

As shown in the breakout, the reinforcing belt 65 may be formed of a plurality of layers 66. Reinforcing belts throughout all of the embodiments disclosed and claimed in this application may be formed of fiber-reinforced polymer-matrix composite materials not unlike the material utilized to form the body of the drive shaft. As mentioned, the two may also be formed of distinct materials.

While the drive shafts illustrated in FIGS. 1A-1C have very good response to any number of challenges, there is a potential risk for buckling under applied, primarily, torsional load. This risk is actually a consequence of high mechanical efficiency of fiber-reinforced composites, resulted in relatively thin walls of the drive shafts if designed for strength and stiffness criteria. The thin-wall structures, however, are much more sensitive to the possibility of buckling, making an advantage in strength and stiffness a disadvantage in buckling.

The risk of buckling has been shown computationally and analytically to be approximately inversely proportional to the square root of the shaft length. If belts 65 are very rigid in their local axial direction (i.e., along the belt orientation), their deformation is negligible in comparison with deformation of the drive shaft body. Therefore, the reinforcing belts 65 effectively break the shaft between ends 30 and 31 into a plurality of shaft sub portions X which are much shorter than the overall length of the shaft. This provides a way to improve the buckling behavior (i.e., increased level of load causing the buckling) by the introduction of such rigid belts.

Note that that rigid belts in FIGS. 2-4 are shown as added to every undulation (or every intermediate portion between the undulations), other embodiments may include designs where the belts are added to just a few undulations, e.g., every second or every third undulation.

FIG. 2B shows another embodiment 70 wherein the reinforcing belt 72 are placed on the enlarged diameter undulations 32. Again, this will break the shaft length between ends 30 and 31 into a plurality of sub lengths X.

Cross-sectional views of the reinforcing belts in FIGS. 2-4 are shown schematically as rectangular for simplicity of demonstration. Their actual cross-sectional shapes can be much more complex geometrically, e.g., their inside profile can be expected to match the curvature of the outside surface of the drive shaft body shell.

FIG. 2C shows embodiment 75 wherein belts 65 and 72 are utilized. Again, this will break the shaft length between ends 30 and 31 into even more subsections X.

Figure 3A:
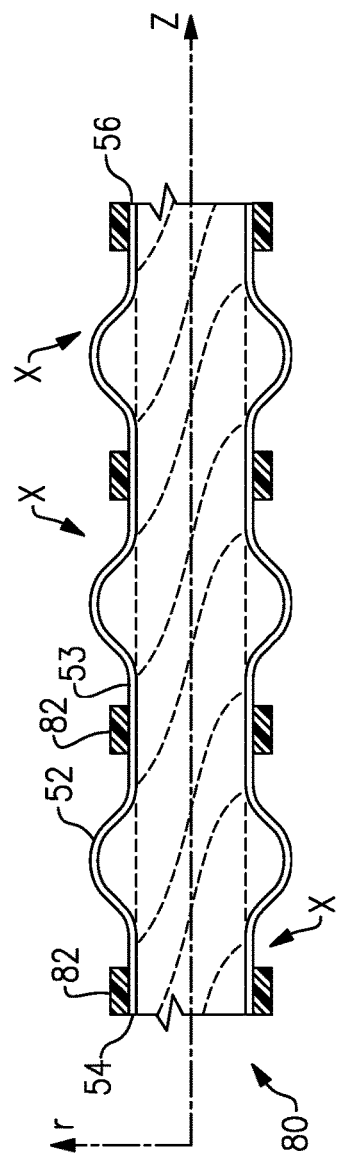
FIG. 3A shows an axial cross-section of the second embodiment having a first option for reinforcing belts.

FIG. 3A shows an embodiment 80 which is similar to the FIG. 1B shaft body. Again, belts 82, which may be structured similar to the belts described in FIGS. 2A-2C, are positioned on the smaller intermediate portions 53. The reinforcing belt 82 in this embodiment would also extend along a spiral, and between the enlarged undulation 52. Again, this will create a plurality of smaller length shaft portions X between the ends 54 and 56.

Figure 3B:
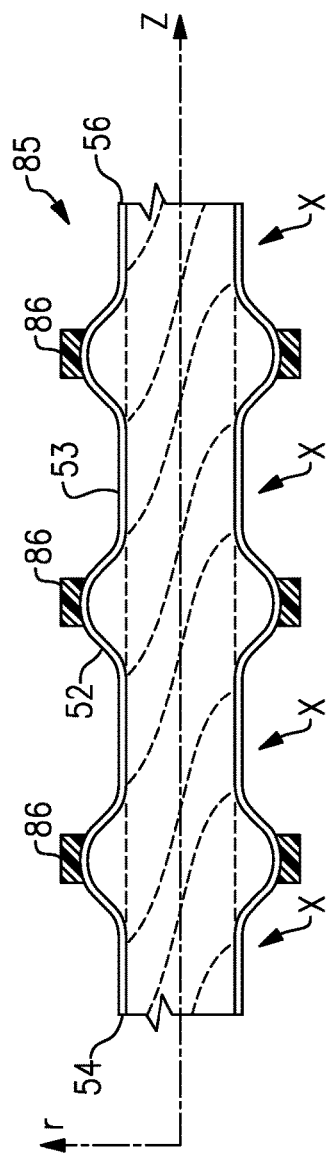
FIG. 3B shows an axial cross-section of the second embodiment having a second reinforcement belt option.

FIG. 3B shows an embodiment 85 wherein there is a reinforcing belt 86 on the enlarged spiral undulations 52. Again, this reinforcing belt 86 extends along a spiral, and breaks the overall shaft into a plurality of shaft sub portions X.

Figure 3C:
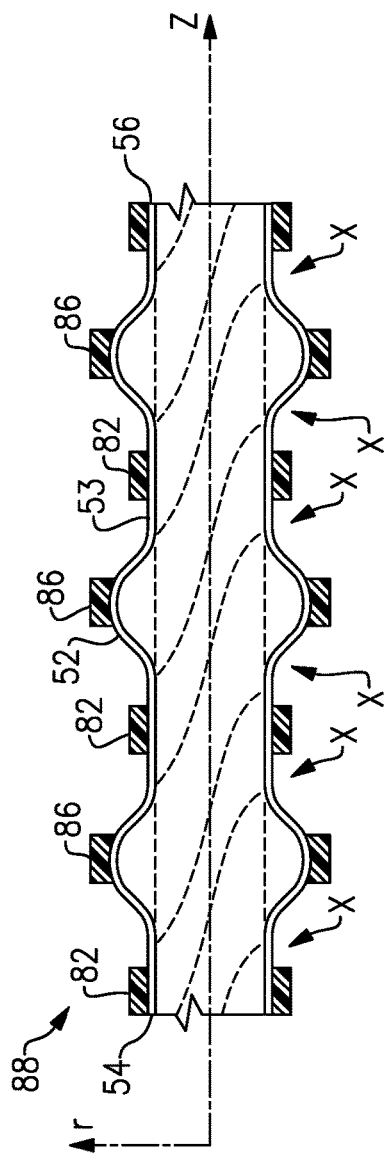
FIG. 3C shows an axial cross-section of the second embodiment having a third reinforcement belt option.

FIG. 3C also shows an embodiment similar to the FIG. 1B shaft body but now there are reinforcing belts 82 and 86 such that there are even more shaft sub portions X.

Figure 3D:
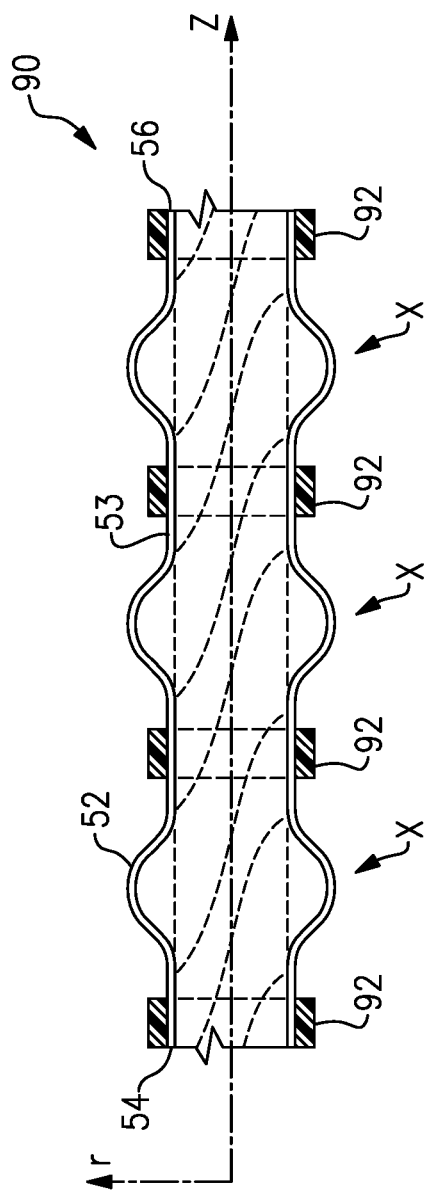
FIG. 3D shows an axial cross-section of the second embodiment with a fourth reinforcement belt option.

FIG. 3D shows an embodiment 90 wherein the reinforcing belts 92 are cylindrical, and are centered on a center axis Z of the drive shaft body, and extend over portions of both the smaller intermediate areas 53 and the enlarged spiral undulations 52. Again, this breaks the overall shaft length between ends 54 and 56 into a plurality of sub portions X.

Figure 4A:
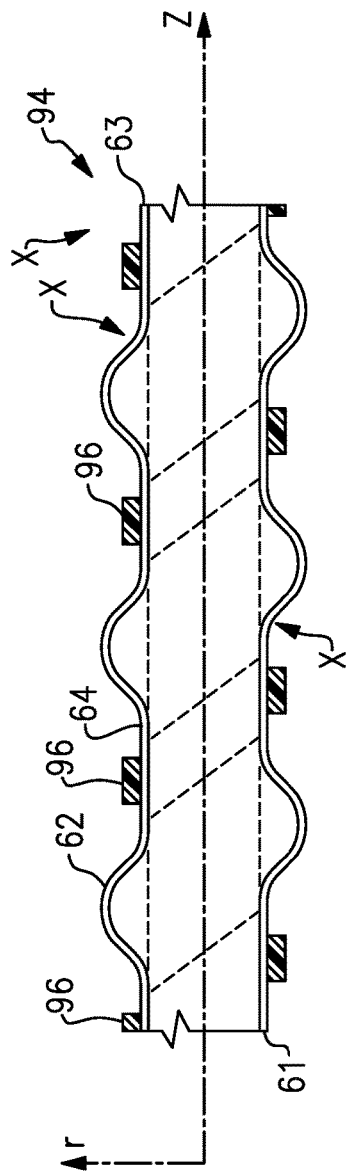
FIG. 4A shows an axial cross-section of the third embodiment having a first option for reinforcing belts.

FIG. 4A shows an embodiment 94 which has a shaft body similar to the FIG. 1C embodiment. Here again, reinforcing belts 96 are positioned on the intermediate areas 64 between the undulations 62. The belts 96 may be spiral, although the equivalent of FIG. 3D may be used. Once again, there are thus a plurality of shaft sub portions X.

Figure 4B:
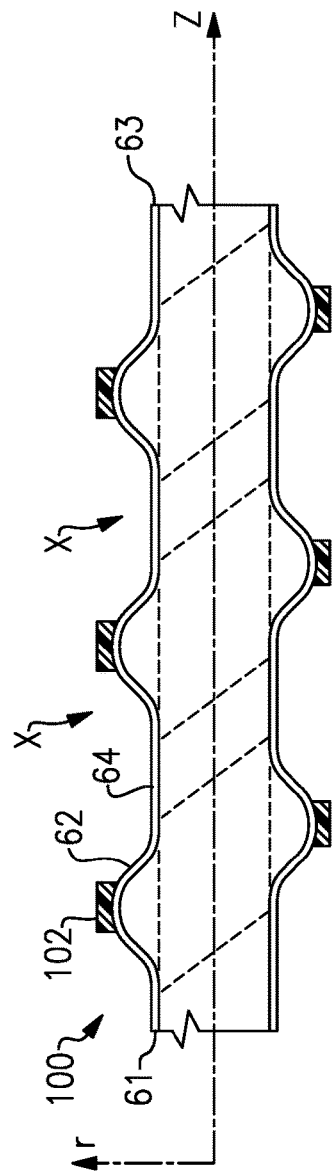
FIG. 4B shows an axial cross-section of the third embodiment having a second reinforcement belt option.

FIG. 4B shows an embodiment 100 of a shaft having a shaft body like that of FIG. 1C, but now the spiral reinforcing belts 102 are on the enlarged undulations 62. Again, belts similar to those of FIG. 3D may be used.

Figure 4C:
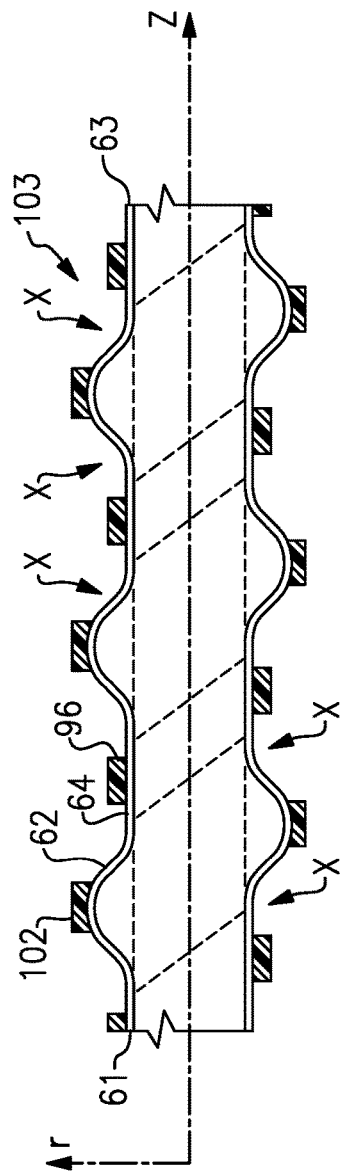
FIG. 4C shows an axial cross-section of the third embodiment having a third reinforcement belt option.

FIG. 4C shows an embodiment 103 wherein there are reinforcing belts 102 and 96 at the location shown in both FIGS. 4A and 4B. This divides the shaft body into a plurality of smaller shaft sub portions X. Again, belts similar to those of FIG. 3D may be used.

Figure 5:
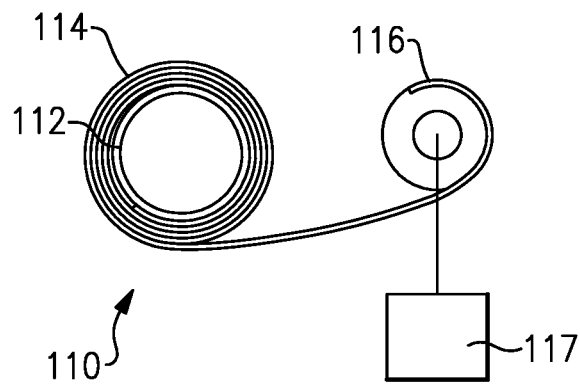
FIG. 5 schematically shows a method of forming a reinforcement belt.

FIG. 5 schematically shows a method of forming a belt. A shaft body 112 is shown having tape layer 114 repeatedly wrapped around it to form a reinforcing belt. The method shown at 110 relies on a roll of tape 116 which is moved by a tool 117, shown schematically, to wrap further layers around the inner body 112 and form the reinforcing belt. This method may be used for any of the above embodiments.

Similar to wrapping the belts as shown in FIG. 5, other manufacturing methods can be applied such as, for example, automated fiber placement (AFP), automated tape laying (ATL), filament wounding or manual layup.

Reinforcing belts can consist of a different number of individual layers. Individual layers can have the same or different widths to generate various geometrical cross-sectional shapes according to specified designs.

FIG. 6A shows one embodiment 200, wherein there is a drive shaft body 202 having a single reinforcing belt 204.

FIG. 6B shows an embodiment 206, where there is an inner drive shaft body 202, a single reinforcement belt 210 and an outer body 212. Notably, the body 212 bends outwardly at 213 to accommodate belt 210.

FIG. 6C shows an embodiment 214, wherein there is an inner body 202, a belt 210, an outer body 212, and an extra wrap 216 having ends 218 which bend to accommodate the outer wrap 212 and belt 210.

FIG. 6D shows an embodiment 220, wherein there are elements 202, 210, 208 and 216 similar to the FIG. 6C embodiment. However, there is yet another body 222 and another outer wrap 224. Elements 222 and 224 may have a shape such as shown to accommodate the components which are positioned radially inwardly.

FIG. 6E shows an embodiment 226 which may be used for each of the wrap locations in the Figures shown in FIGS. 2-4. There is an inner shaft body 202, a plurality of spaced inner belts 228. An outer body 230, a wrap 234 and another outer body 238, with yet another wrap 240 having a deformed portion 242. Notably, each of the embodiments of FIGS. 6A-6E show belts on the outer periphery of the inner drive shaft body 202.

FIGS. 7A-7D show embodiments wherein the belt is positioned on an inner periphery of the inner drive shaft body.

Figure 7A:
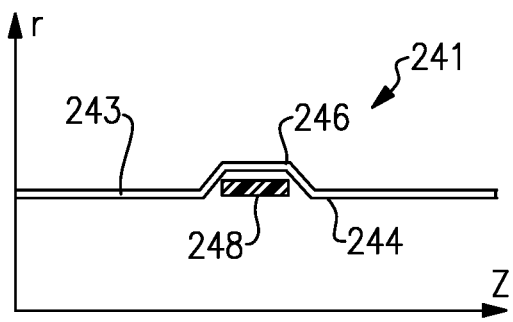
FIG. 7A shows a fragment of an axial cross-section of a drive shaft wall with another reinforcement belt option.

As shown in FIG. 7A, an embodiment 241 has a drive shaft body 243 having an inner belt 248 at the inner periphery 244 of the drive shaft body 243. The drive shaft body 243 is deformed outwardly at 246 to accommodate the belt 248 and allow the inner diameter to be relatively constant.

Figure 7B:
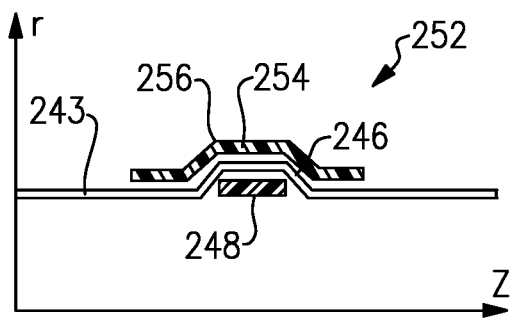
FIG. 7B shows a fragment of an axial cross-section of a drive shaft wall with another reinforcement belt option.

FIG. 7B shows an embodiment 252 having a reinforcing belt 248 inside the drive shaft body 243 and outer wrap 254 having the deformation 256.

Figure 7C:
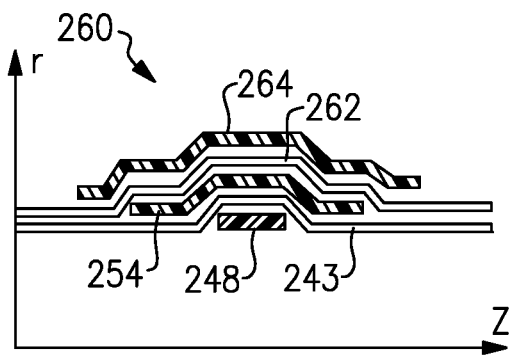
FIG. 7C shows a fragment of an axial cross-section of a drive shaft wall with another reinforcement belt option.

FIG. 7C shows an embodiment 260 having elements 243/248/254 similar to the FIG. 7B embodiment. However, an outer drive shaft body 262 is positioned outwardly of that structure, and an outer wrap 264 is positioned outwardly of body 262.

Figure 7D:
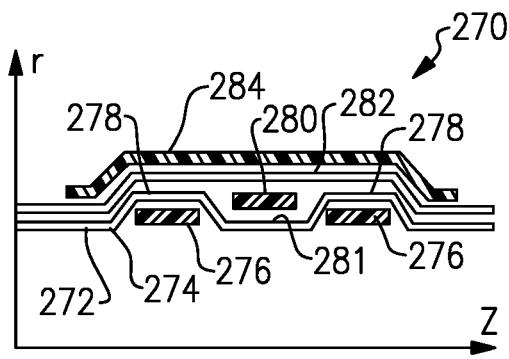
FIG. 7D shows a fragment of an axial cross-section of a drive shaft wall with another reinforcement belt option.

FIG. 7D shows an embodiment 270 wherein there are a pair of reinforcing belts 276 at an inner peripheral surface 274 of a drive shaft body 272. There is another belt 280 positioned outwardly of an outer peripheral surface 281 of the drive shaft body 272. Another drive shaft body 282 is positioned outwardly of the belt 280, and body 272. And further wrap 284 is positioned outwardly of all of this structure. As in the earlier embodiments, the several layers are deformed to accommodate the structure received radially inwardly of each component.

Figure 8:
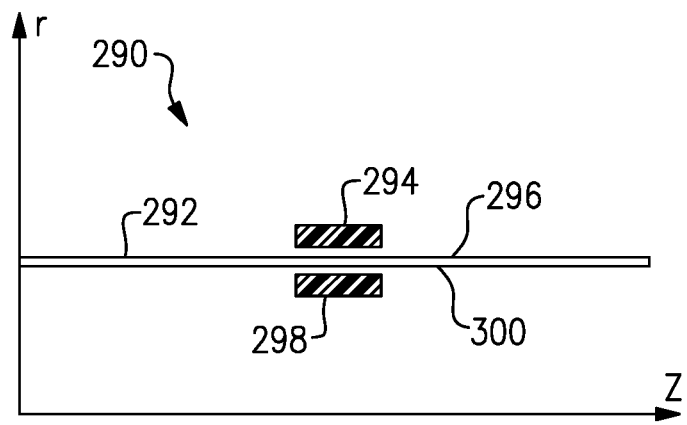
FIG. 8 show a fragment of an axial cross-section of a drive shaft wall with yet another reinforcement belt option.

FIG. 8 shows an embodiment 290 wherein a drive shaft body 292 has a belt 294 on an outer peripheral surface 296 and a belt 298 on an inner peripheral surface 300.

The FIGS. 6-8 show clearance between the several members. Of course, in practice, they would be secured to each other without clearance. However, to better illustrate the original shapes they are illustrated with clearance.

All of the belts are rigidly connected to the bodies of the drive shaft. This makes deformation of the segments X close to independent of each other, if a torsional load is applied at the ends of the entire shaft. The rigidity of the belt is provided by the belt cross-section, and its composite materials. The fiber orientation along each belt can be controlled to increase the rigidity. Since the belts are rigid, their shapes remain almost unchanged during torsional loads, and thus resist any buckling effect.

Figure 9:
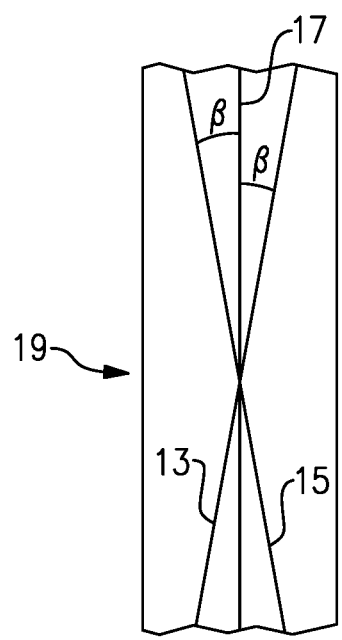
FIG. 9 shows a fiber feature of the reinforcement belts.

FIG. 9 shows a drive belt segment 19. Fiber 17 is shown extending generally at a single axial location. Fibers 13 and 15 are shown extending back and forth at a small angle β relative to a single axial location. It should be understood that, while a single fiber is shown in practice that will be a very large number of fibers. Preferably, β is less than or equal to 30 degrees. Drive belts under this disclosure could use fiber orientations as at 17, or fibers orientated like 13 and 15. Also a combination of the orientations 13, 15 and 17 may be used.

A drive shaft under this disclosure could be said to include a drive shaft body extending between axial ends and having an axial cross-sectional shape, which includes a plurality of undulations increasing a drive shaft body diameter through an infinite number of diameters across at least 15% of an axial length between the axial ends. There is at least one reinforcing belt associated with adjacent ones of the plurality of undulations.

A drive shaft under this disclosure could also be said to include a drive shaft body extending between axial ends and having an axial cross-sectional shape which includes undulations increasing a drive shaft body diameter through an infinite number of diameters across at least 15% of an axial length between the axial ends. The undulations extend along a non-zero angle relative to a circumferential direction defined relative to a drive axis of the drive shaft, such that the undulations form a spiral with an intermediate smaller diameter spiral portion. There is at least one reinforcing belt associated with at least one of the undulations and the intermediate portion.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A drive shaft comprising:
   a drive shaft body extending between axial ends and having an axial cross-sectional shape, which includes a plurality of undulations increasing a drive shaft body diameter through an infinite number of diameters across at least 15% of an axial length between the axial ends, and there being at least one reinforcing belt associated with adjacent ones of said plurality of undulations; and
   wherein said plurality of undulations extending along a non-zero angle relative to a circumferential direction defined relative to a drive axis of said drive shaft, such that they form a spiral with a spiral smaller diameter intermediate portion.

2. The drive shaft as set forth in claim 1, wherein said at least one reinforcing belt is positioned on said intermediate portion.

3. The drive shaft as set forth in claim 2, wherein said at least one reinforcing belt is a plurality of reinforcing belts also positioned on said enlarged undulations.

4. The drive shaft as set forth in claim 1, wherein said at least one reinforcing belt is a plurality of reinforcing belts positioned on said enlarged undulations.

5. A drive shaft comprising:
   a drive shaft body extending between axial ends and having an axial cross-sectional shape which includes undulations increasing a drive shaft body diameter through an infinite number of diameters across at least 15% of an axial length between the axial ends, and said undulation extending along a non-zero angle relative to a circumferential direction defined relative to a drive axis of said drive shaft, such that the undulations form a spiral with an intermediate smaller diameter spiral portion, and there being at least one reinforcing belt associated with at least one of said undulations and said intermediate portion.

6. The drive shaft as set forth in claim 5, wherein there being at least one reinforcing belt including a plurality of reinforcing belts associated with both said undulations and said intermediate portion.

7. The drive shaft as set forth in claim 5, wherein there are a plurality of spaced undulation portion with intermediate smaller diameter portions that do not extend along a non-zero angle.

8. The drive shaft as set forth in claim 5, wherein said drive shaft body and said at least one reinforcement belt are both formed of a fiber-reinforced polymer-matrix composite.

9. A drive shaft comprising:
   a drive shaft body extending between axial ends and having an axial cross-sectional shape, which includes a plurality of undulations increasing a drive shaft body diameter through an infinite number of diameters across at least 15% of an axial length between the axial ends, and there being at least one reinforcing belt associated with adjacent ones of said plurality of undulations;
   wherein said plurality of undulations are provided by a plurality of increased diameter sections which are axially spaced along an axial length of the drive shaft between axial ends, and with smaller diameter intermediate portions;
   wherein said at least one reinforcing belt includes a plurality of reinforcing belts positioned on at least some of said intermediate portions;
   wherein said at least one reinforcing belt includes a plurality of reinforcing belts positioned on at least some of said plurality of undulations; and
   wherein said drive shaft body and said plurality of reinforcement belts are formed of a fiber-reinforced polymer-matrix composite.

10. The drive shaft as set forth in claim 9, wherein the undulations extending along a non-zero angle relative to a circumferential direction defined relative to a drive axis of said drive shaft to form portions such that there are distinct and separate portions of said undulations formed along a non-zero angle with intermediate portions.

11. The drive shaft as set forth in claim 9, wherein said at least one reinforcing belt is on an outer periphery of said drive shaft body.

12. The drive shaft as set forth in claim 11, wherein there being an outer drive shaft body wrapped over said at least one reinforcing belt.

13. The drive shaft as set forth in claim 9, wherein said at least one reinforcement belt is on an inner periphery of said drive shaft body.

* * * * *